(12) United States Patent
Weigerstorfer et al.

(10) Patent No.: US 8,616,478 B2
(45) Date of Patent: Dec. 31, 2013

(54) PROCESS AND APPARATUS FOR TREATMENT OF A MATERIAL

(75) Inventors: Georg Weigerstorfer, Linz/Ebelsberg (AT); Klaus Feichtinger, Linz (AT); Peter Pauli, Allhaming (AT)

(73) Assignee: EREMA Engineering Recycling Maschinen und Anlagen Gesellschaft m.b.H., Ansfelden (AT)

( * ) Notice: Subject to any disclaimer, the term of this patent is extended or adjusted under 35 U.S.C. 154(b) by 305 days.

(21) Appl. No.: 12/526,755

(22) PCT Filed: Feb. 8, 2008

(86) PCT No.: PCT/AT2008/000045
§ 371 (c)(1),
(2), (4) Date: Feb. 23, 2010

(87) PCT Pub. No.: WO2008/098274
PCT Pub. Date: Aug. 21, 2008

(65) Prior Publication Data
US 2010/0140381 A1   Jun. 10, 2010

(30) Foreign Application Priority Data
Feb. 15, 2007  (AT) .................................. A 244/2007

(51) Int. Cl.
*B02C 23/00* (2006.01)
*B02C 21/00* (2006.01)
*B02C 13/28* (2006.01)
*B02C 1/10* (2006.01)

(52) U.S. Cl.
USPC .......... 241/57; 241/186.5; 241/275; 241/277; 241/244

(58) Field of Classification Search
USPC ............. 241/57, 62, 275, 186, 246, 247, 244, 241/245, 277, 278.1, 282.1, 282.2
See application file for complete search history.

(56) References Cited

U.S. PATENT DOCUMENTS

| 4,394,980 A * | 7/1983 | Marz et al. ................. 241/46.02 |
| 4,556,175 A * | 12/1985 | Motoyama et al. ............. 241/57 |
| 6,719,454 B1 * | 4/2004 | Bacher et al. ................. 366/314 |
| 6,745,960 B1 * | 6/2004 | Myo et al. ......................... 241/5 |

FOREIGN PATENT DOCUMENTS

| DE | 24 32 494 A1 | 1/1976 |
| DE | 26 09 850 A1 | 9/1977 |
| DE | 42 00 827 A1 | 7/1993 |
| DE | 42 05 073 A1 | 8/1993 |
| WO | WO 2005/087474 A | 9/2005 |

* cited by examiner

*Primary Examiner* — Faye Francis
(74) *Attorney, Agent, or Firm* — Kilpatrick Townsend & Stockton LLP

(57) ABSTRACT

The invention relates to a process and an apparatus for the treatment of a material in the form of fragments or particles which is moved and/or rotated, mixed, heated and, if appropriate, comminuted by at least one mixing element (12, 21) in a receiver or cutter-compactor (1), where, in the course of the process, undesired substances which impair the treatment of and/or further operations on the material are removed from the material by introducing a gas, in particular air or an inert gas, in a region below the level of the material located in the receiver (1) during its operation, or below the level of material of the mixing vortex which forms within the receiver (1), where the gas is forced to flow through at least a subregion of the material, and where the gas then saturated with, or with an increased concentration of, undesired substances is discharged from the receiver (1) in a region above the level of the material located in the receiver (1) during its operation or above the level of the material of the mixing vortex.

24 Claims, 7 Drawing Sheets

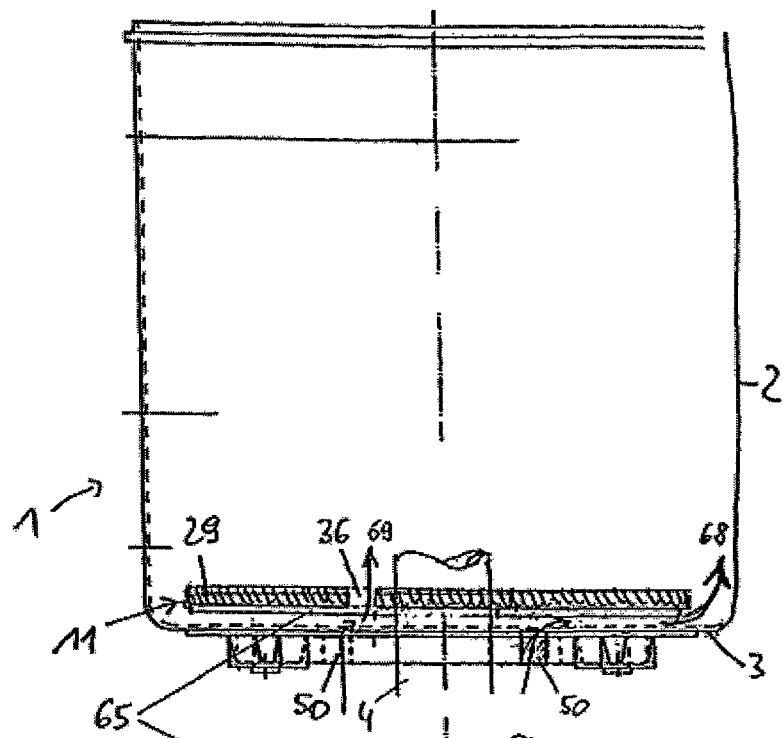
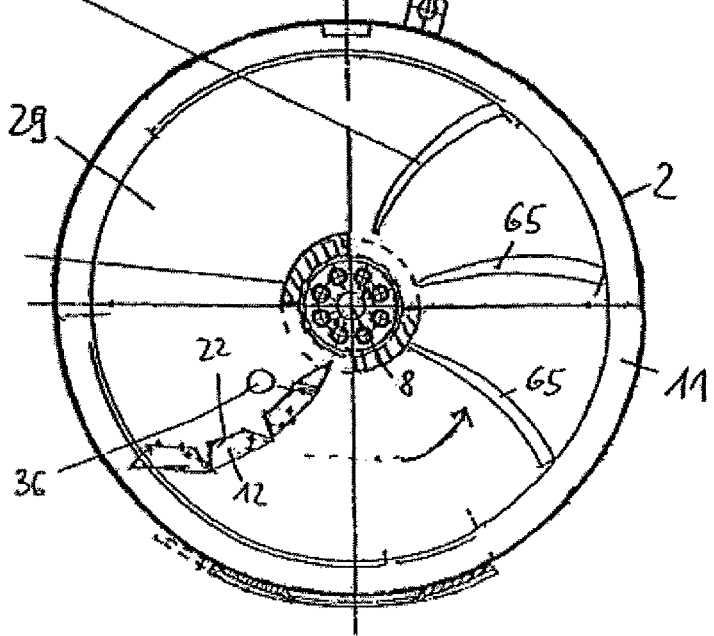

PROCESS AND APPARATUS FOR TREATMENT OF A MATERIAL

CROSS REFERENCE TO RELATED APPLICATIONS

This application is a National Stage of International Application No. PCT/AT2008/000045 filed Feb. 8, 2008 and which claims the benefit of Austrian Patent Application No. A 244/2007, the disclosures of all applications being incorporated herein by reference.

The invention relates to a process according to Claim 1 as well as to an apparatus according to Claim 11.

Numerous plastic recycling applications suffer from problematic loading influences such as high residual moisture, large density test fluctuations, feed portions that are too large, etc. This negatively influences the performance of the following extruder and the economy of the process. The extruder suffers under these loading influences, which leads to reduced and fluctuating discharge performance, non-uniform melting performance, reduced product quality, possibly elevated wear and on the whole in a reduced productivity.

Apparatuses with two superposed mixing tools in the cutting compressor are known from the state of the art, e.g., from WO 00/74912 A1, that reduce these problems.

The zone where the comminution and/or drying and/or preheating of the material primarily takes place is separate from the zone in which the material is pressed into the worm housing. Here, an equilibrium is established after a short operating time between the material volume drawn off from the worm under the carrier disk and between the material flow entering through the annular gap from the top downward into the space under the carrier disk. This has the consequence that the space underneath the carrier disk, which space is substantially filled with material to be transported away from the worm, opposes a certain resistance to the withdrawal of the material, which is circulating in the form of a mixing vortex in the receiving container so that—if at all—only an exceedingly small portion of the material introduced fresh into the receiving container can immediately pass down into the region under the revolving carrier disk.

This contributes to ensuring a sufficient dwell time of the material in the receiving container, in particular in its region above the carrier disk. This homogenizes the temperature of the material introduced into the discharge opening of the receiving container since substantially all plastic parts present in the container are sufficiently prepared. The approximately constant temperature of the material entering into the worm housing has the result that inhomogeneous plastic nests and/or plastic regions in the housing of the extruder worm are largely eliminated and as a result the worm length can be maintained shorter than in the known constructions since the worm has to perform less work in order to safely bring the plastic material to the same plasticization temperature. The constant entering temperature of the plastic material into the worm housing furthermore has as a consequence a uniform pre-compression of the material in the worm housing, which has an advantageous effect on the conditions at the extruder opening, in particular in the form of a uniform extruder throughput and a uniform material quality at the extruder discharge. The shortened worm length results in a savings of energy and a processing temperature in the extruder that is lower in comparison to other constructions since the average temperature with which the material enters into the worm housing is more uniform than in these other constructions. Thus, in such apparatuses the processed plastic material—viewed over the entire processing procedure—is brought to a temperature that is less high in comparison to the known constructions in order to have the reliability of a sufficient plasticization. This reduction of the peak temperatures consequently has the initially mentioned savings of energy and furthermore the avoiding of thermal damage to the material to be processed.

Thus, by means of the arrangement of two superposed mixing tools in the cutting compressor and of the design of two successive treatment stages a separation of the work step of the "material preparation", that is, of the comminution, drying, preheating, compressing and mixing of the work step of the "loading of the extruder" takes place in a simple manner. As a result of the decoupling of the two work steps negative loading influences as described from the extruder and its sensitive loading or draw-in zone are largely avoided. The result is a very uniformly loaded and very uniformly running extruder that can produce up to 15% more output independently of loading influences. Furthermore, larger feed portions can be processed, a higher residual moisture in the feeding material is admissible, a higher throughput performance can be achieved, the material has a lower melting temperature, and savings of energy costs with a higher granulate quality occur.

Such apparatuses have proven themselves very well for the treatment in particular of thermoplastic plastic material; however, it turned out that occasionally the shutting in of volatile substances given off from the processed material occurs in the space under the upper carrier disk. These volatile substances cannot always escape upward through the annular gap present between the edge of the carrier disk and the inner wall of the receiving container, especially since the material to be processed passes from the top downward through this annular gap. It is especially unpleasant if the volatile substances are removed with the processed material out of the receiving container and passed directly or indirectly to the extruder connected to the receiving connector since there is then the danger that the inclusion of gases of different types are present in the extruded material, which significantly reduces the quality of the material obtained at the extruder discharge. This danger can also not be completely eliminated by a degassing apparatus that is usually provided in the extruder. In addition, such volatile substances and/or problematic substances can usually not be avoided in advance because they are water vapor, separation products of the material to be processed, gaseous or evaporated cooling agent components, etc. These volatile substance components can be considerable, in particular in moist plastic material introduced into the receiving container.

In order to avoid these disadvantages and to make the material removed through the discharge opening of the receiving container at least substantially free of the cited volatile substances with low cost, it can be provided that the carrier disk has a perforation, in particular arranged in the vicinity of the axis and in the vicinity of the tool edges trailing during the revolution of the carrier disk, which perforation connects the space above this disk with the space below it. The volatile substances present in the space under the carrier disk or which are being produced there can escape upward through this perforation through the carrier disk into the space above it, where they are not damaging and from where they can escape, if necessary. Tests have shown here that perforations arranged in the vicinity of the axis are more effective than perforations arranged at a distance from the axis. The perforations arranged in the vicinity of the tool edges trailing during the revolution of the carrier disk make use of the suction action produced by the rotating tools in order to remove the cited volatile substances by suction from the space under the carrier disk.

Nevertheless, such apparatuses are usually not capable of completely removing all problematic substances, which has as a consequence an adverse influence on the treatment or processing.

Problematic substances are basically all substances that exit from the material to be treated and come loose from the introduced material or are possibly even introduced together with the material and that can entail a subsequent adverse influencing of the processing. The problematic substances can adhere externally on the surfaces of the material to be treated, as is the case in particular for wash water, surface coatings, etc, and which then evaporate there, sublime, come loose from the surface or the like. However, the problematic substances can also be present in the matrix of the material or in the interior of the material and then diffuse outward in the course of a processing where they evaporate, sublime or the like. This can be observed in particular in organic additives, for example, in softeners, but also water, monomers, gases or waxes can be present in the matrix. Thus, the problematic substances to be removed can also be subliming solids or dust.

There are problems in particular in plastic materials with a high external moisture, such as, for example, polyolefin washing chips, etc. Even materials with a high internal moisture, for example, PA fibers, are problematic. Condensation and evaporation can then occur between the disks and/or mixing tools due to the air saturated with moisture, which for its part results, in addition to the other disadvantages mentioned, in an elevated energy requirement of the system.

Apparatuses are known from the state of the art with which, e.g., water vapor that formed over the material to be processed can be removed by suction removal apparatuses. However, a receiving container such as is used in the above-mentioned apparatuses is substantially gas-tight in its lower region and/or a pressure-compensating subsequent flow of air from below is only possible with difficulty so that the moisture-saturated air cannot be readily removed by suction. This is associated with additional difficulties in apparatuses with several superposed disks and/or mixing tools.

During the treatment of material with high residual moisture a certain movement dynamic arises by itself in the cutting compressor due to the large amount of the water vapor produced that supports a removal by suction of the moist air. However, this is not the case in the treatment of material with low residual moisture, in which case the moisture-saturated air collects in a central depression of the mixing vortex just above the material level. A supporting dynamic is not formed and the removal by suction and/or removal of this moist air is significantly more difficult.

The present invention therefore has the problem of creating a process and an apparatus that make it possible to remove undesired problematic substances that adversely affect the treatment and/or further processing of the material, for example, volatile substances, in particular moisture and/or water vapor, from the material to be treated and to conduct and influence the treatment process in an advantageous manner.

This problem is solved by the process according to Claim 1 as well as by the apparatus according to Claim 11 in that a gas that is capable of absorbing and/or entraining the problematic substances, especially air or an inert gas, is introduced into the interior of the cutting compressor from below, i.e., in a region below the level of the material in the cutting compressor or below the material level of the developing mixing vortex and the gas enriched and/or saturated with problematic substances is removed from the cutting compressor in a region above the level of the material in the operation in the cutting compressor or above the material level of the mixing vortex. A forced flow is formed thereby and the gas flows through at least a partial region of the material. The moisture and/or the problematic substances present in the material in an apparatus with two superposed mixing tools in particular in the region between the disks or mixing tools are effectively removed in this manner.

Other advantageous embodiments of the invention are described in the dependent claims.

The gas supply means can be designed as passive gas supply means, for example, as mere passage openings through which the gas is drawn in only passively, for example, by subpressure into the interior of the cutting compressor. However, the gas supply means can also be designed as active gas supply means, for example, as nozzles or the like through which the gas is actively blown in, sprayed in or pumped in with pumps, blowers, etc. with overpressure.

Likewise, the gas removal means can be designed as passive gas removal means through which the gas is forced, passes slowly by overpressure in the receiving container or as active gas removal means loaded, for example, via suction pumps.

The gas is advantageously heated or pre-dried by a heating apparatus or a gas drying apparatus that are connected in front before it is supplied to the receiving container. In this manner the removal of the problematic substances and also the carrying out of the process can be effectively controlled.

In order to regulate the gas supply and gas removal the gas supply means and/or gas removal means can be closed and/or regulated at least partially.

The gas supply means can be constructed as individual singular openings with a diameter between 10 and 300 mm, preferably between 50 and 90 mm.

A covering or shield can be provided on the side of the gas supply means facing the interior of the receiving container, in particular upstream from the direction of rotation of the material, in order to prevent the material from clogging the gas supply means.

In order to not disturb, to the extent possible, the rotational movement in the interior of the receiving container and to avoid local overheating, it is furthermore advantageous that the gas supply means seal flush with the inner wall of the container and do not extend out or project from it.

The characteristic design of the gas supply means as well as their position influences the flowthrough of the material with the gas and therewith the removal of the problematic substances.

On the one hand the gas supply means can be constructed in the bottom surface of the cutting compressor below the lowest bottom mixing tool and preferably inside the innermost radius third of the bottom surface there. If the gas supply means are constructed in the bottom surface a loosening of the sump also occurs by the blowing in of the gas from below, which ensures an even better treatment of the material.

The gas supply means can be designed here as individual singular openings or in the form of an annular slot-like opening running almost continuously around the leadthrough of the driveshaft of the mixing tool through the bottom surface.

Alternatively or additionally to the openings in the bottom surface the gas supply means can also be arranged in the side wall of the cutting compressor, in which case care should be taken that the gas supply means are constantly below the material level. Positions of the gas supply means in the region of the lowest third of the total height of the cutting compressor, in particular underneath the lower or lowest mixing tools in the vicinity of the bottom are advantageous.

In apparatuses with several superposed mixing tools it is extremely advantageous for carrying out the process if the gas supply means are arranged between the uppermost and the lowest mixing tools and empty into the space formed between them. In this manner the gas or air flows well through the material and the flow cooperates with the through mixing by the mixing tools in an advantageous manner.

The gas supply means advantageously do not empty in the region of the edges of the carrier disks or of the mixing tools but rather in particular in the region between each two carrier disks or mixing tools into the receiving container and are arranged there, in which case the gas supply means are arranged in particular centrally between each two carrier disks or mixing tools.

It is especially advantageous in this connection if perforations are formed in the upper carrier disk, since the problematic substances can be effectively removed from the region between the mixing tools in this manner.

If the gas supply means are constructed in the region of the side wall of the container in which the rotating material particles exert the greatest pressure on the side wall, the gas supply means must counteract this pressure and blow the gas in under pressure as active gas supply means into the container interior.

The gas supply means can also be constructed as individual singular openings in the side wall. However, they can also be constructed in the form of an annular gap extending along the circumference.

Alternatively or additionally to the previously described arrangement possibilities, the gas supply means can also be arranged on at least one of the mixing tools or on the carrier disk. An arrangement on the lower mixing tool that is the closest to the bottom surface or on the lower carrier disk is advantageous here. It is advantageous to construct the gas supply means on the side facing the bottom surface in the arrangement of the gas on the mixing tools or carrier disks.

Moreover, it is advantageous to arrange the gas supply means in the vicinity of the axis of the carrier disk or of the mixing tools and advantageously in the vicinity of the tool edges trailing during the revolution of the carrier disk or in the vicinity of the perforation. In this manner an effective removal of the problematic substances can be ensured.

According to a preferred embodiment it is advantageous to construct transport wings on the bottom of the carrier disk that bring about a flow of material and gas upward from the region below the carrier disk. In this embodiment the transport wings therefore cooperate in an advantageous manner with the gas supply means and optionally formed perforations and ensure in this manner an effective material discharge from the region below the carrier disk and an advantageous carrying out of the process.

In order to prevent an entrainment of material particles and/or flakes by too strong a removal of the gas by suction, it is advantageous to arrange the gas supply means this far as possible away from the material level, in particular in the cover of the receiving container.

Other characteristics and advantages of the invention result from the description of exemplary embodiments of the subject matter of the invention that are schematically represented in the drawings.

FIG. 10 shows another exemplary embodiment in vertical section.

FIG. 11 shows a top view of it.

Figure 1:
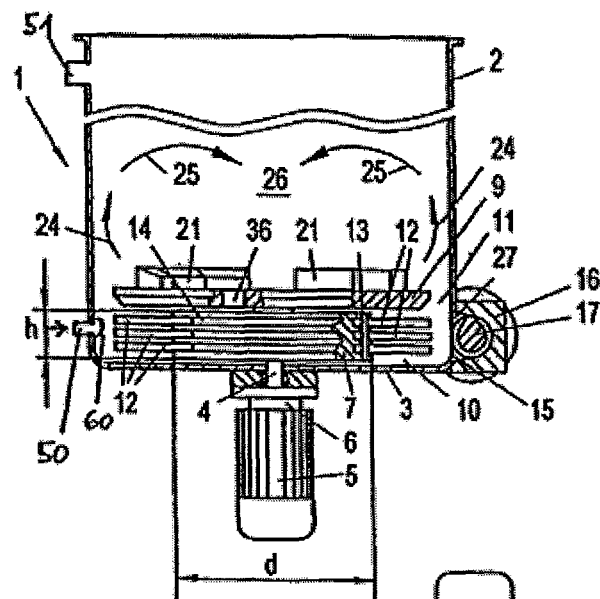
FIG. 1 shows a vertical section through an apparatus in accordance with the invention according to a first exemplary embodiment.
Figure 2:
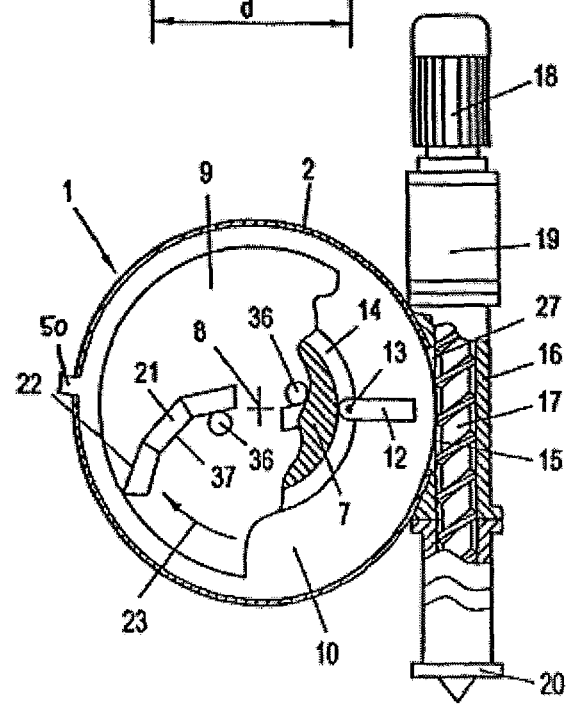
FIG. 2 shows a top view of FIG. 1 in partial section.

In the embodiment according to FIGS. 1 and 2 the apparatus comprises a receiving container and/or cutting compressor 1 for the plastic material, in particular thermoplastic plastic material to be processed that is introduced in this container 1 from above by a transport apparatus, e.g., a conveyor belt (not shown). The supplied plastic material can be pre-comminuted and/or pre-dried.

Receiving container 1 is cylindrically cup-shaped with vertical side walls 2 and has a horizontal level bottom 3 with a circular cross section. Receiving container 1 can be open or closed at the top. A shaft 4 mounted in a sealed manner runs through bottom 3 and has a vertical axis 8 that coincides with the container axis. Shaft 4 is driven in a rotary motion by a motor 5 with transmission 6 arranged underneath bottom 3. In container 1 a rotor 7 and a carrier disk 9 arranged above it are connected in a torque-locking manner to shaft 4. Rotor 7 is formed by a circular cylindrical block whose axial extent h is considerably larger than that of flat carrier disk 9, whose radial extent d is, however, considerably smaller than that of carrier disk 9. In this manner a free space 10 is formed below carrier disk 9 that has a free flow communication for the processed material via an annular gap 11 with the space 26 of container 1 located above carrier disk 9, which is present between the circumference of carrier disk 9 and side wall 2 of container 1. The processed plastic material can pass through this free annular gap 11 without hindrance from the upper space 26 into the annular space 10 located below it.

Upper carrier disk 9 carries permanently arranged upper mixing tools 21 on its upper side that mix and/or comminute and/or heat the material located in space 26 of container 1. For an effective comminution tools 21 can be constructed with cutting edges 22 that can be designed curved or bent (FIG. 2) counter to the direction of rotation of carrier disk 9 (arrow 23) in order to achieve a draw cut.

A circulation of the plastic mass introduced into container 1 during operation results during the rotation of carrier disk 9 by the influence of tools 21, during which the processed material rises up along side wall 2 of container 1 in space 26 (arrow 24) and falls back down again in the region of the container axis (arrow 25). The mixing vortex produced in this manner thoroughly swirls the introduced material so that a good mixing effect is achieved.

The material that is introduced into container 1 and comminuted there if necessary passes gradually through annular slot 11 into space 10 located underneath carrier disk 9 and is processed there by lower mixing tools 12 in the vicinity of bottom surface 3 that are pivotably fastened there by vertical bolts 13 in annular grooves 14 of rotor 7 so that these tools 12 can oscillate freely about the axes of bolts 13. The free ends of lower tools 12 are located at a distance from side wall 2 of container 1. These lower tools 12 bring about an additional mixing and/or comminution and/or heating of the material present in space 10 by their beating action.

The material is transported by the centrifugal force exerted by these lower tools 12 in the vicinity of the bottom on the material into a discharge opening 15 of container 1 that is located approximately at the height of the additional lower tools and connects space 10 of container 1 to a draw-in opening 27 of a worm housing 16 in which a worm 17 is rotatably supported that is driven in a rotary motion on its one front end by a motor 18 with transmission 19 and extrudes the plastic material supplied to it on the other front end, e.g., through an extruder head 20. It can be a simple worm, a double worm or a multiple worm. As can be seen, worm housing 16 is connected approximately tangentially to the cutting compressor so that deflections of the plastic material plasticized by worm 16 in the region of its discharge from housing 16 are avoided. Instead, worm 17 can also be a pure transport worm that supplies the material treated in container 1 to further usage, e.g., to an extruder.

During operation a state of equilibrium is adjusted after a short running-in time between the material removed by the worm and the material coming into space 10 from above through annular gap 11. This has the result that it is very unlikely that a plastic particle brought into container 1 passes into worm housing 16 without having previously spent a sufficient dwell time in container 1. This ensures a sufficient processing of all plastic particles by the mixing tools 12, 21 so that the material removed by worm 17 has an at least approximately uniform quality, in particular as regards the temperature and the size of the plastic particles. This means that the plasticizing work to be performed by worm 17 or the connected extruder worm is comparatively small so that high thermal heat loads on the plastic material during the plasticizing work are eliminated. As a result, the plastic material is protected and drive energy for worm 17 and/or the extruder worm is saved to a considerable extent.

As mentioned, the material introduced into container 1 is as a rule not completely dry and/or it has contaminants that emit volatile substances during the processing in the container, e.g., water vapor, separation products from the material to be processed, evaporated cooling agent, volatile substances from coloring and/or printing material, etc. In order to effectively remove these problematic substances or to avoid that these volatile substances collect in space 10 under upper carrier disk 9 and thus hinder the passage of processed material from space 26 into space 10 and/or pass into the interior of worm housing 16, carrier disk 9 according to FIGS. 1 and 2 has at least one, but preferably several perforations 36 that connect space 26 above carrier disk 9 to space 10 located under it. The volatile substances trapped in space 10 can escape upward through these perforations 36 through carrier disk 9 and thus be removed from container 10, for example, by an exhaust 51.

These perforations can be formed by bores that are circular or slotted in a cross section. At least a few of these perforations are arranged in the vicinity of axis 8 of container 1 directly behind tools 21 so that perforations 36, viewed in the direction of rotation (arrow 23) of carrier disk 9, are adjacent to the trailing edges 37 and/or edges of tools 21. The suction effect produced by tools 21 during their rotation on their trailing edge supports the removal by suction of the volatile substances up through perforations 36.

Figure 6:
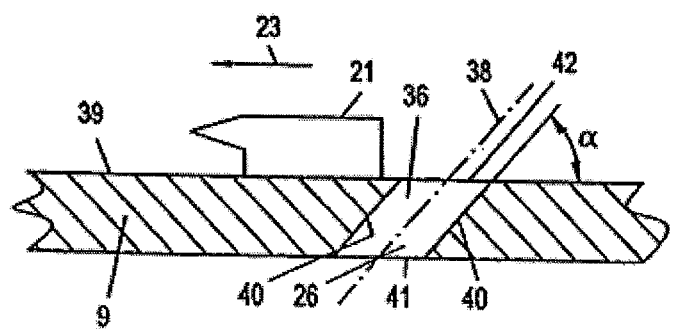
FIG. 6 shows a detail in vertical section through the carrier disk.

The axes of perforations 36 can run vertically; however, it is more advantageous to arrange these axes 38 obliquely according to FIG. 6 in such a manner that they are inclined to the plane of cover surface 39 of carrier disk 9 as well as to container axis 8. The inclination of walls 40 of the perforations (angle α, FIG. 6) is advantageously between 30 and 60°, preferably approximately 45°. This inclination is selected in such a manner that the entrance end 41 of each perforation 36, viewed in the direction of rotation of carrier disk 9 (arrow 23) is located further to the front than the exit end 42. Even this measure supports the already mentioned suction action and counteracts a direct falling of the material out of space 26 through perforations 38 into space 10.

Figure 3:
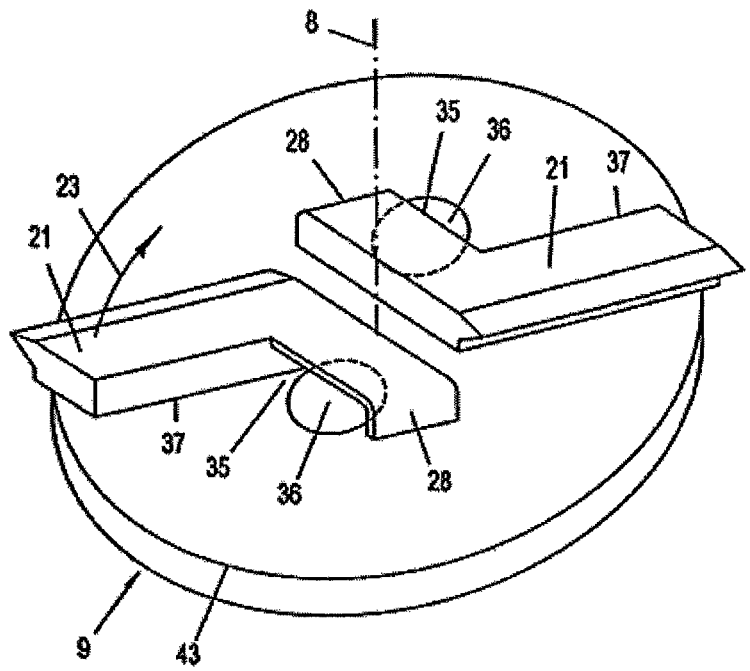
FIG. 3 shows the construction of covers for the perforations in an axonometric manner.

Furthermore, it is advantageous, as is apparent from FIG. 3, to provide the perforations or at least a few of them with a cover 28 that covers the perforation 36 all the way around except for an opening 35 that is directed outward in the direction of the circumference 43 of carrier disk 9 or is directed radially (relative to axis 8).

The size, i.e. the cross-sectional surface of perforations 36 is a function of the amount of the volatile substances to be removed. As a rule it is sufficient to dimension the cross-sectional surface of all perforations 36 to be maximally as large as the cross-sectional surface of all worms or worm housings of the extruder or of worms 17 with a flow communication with the discharge opening 15 of container 1.

A gas supply means 50, 50a, 50b is arranged in the lower region of sidewall 2 of container 1 and empties in sidewall 2 of receiving container 1 into receiving container 1. This gas supply means 50 is constructed as an active gas supply means 50a in the form of a nozzle 50a, i.e., gas can be blown in under pressure into the interior of the cutting compressor.

Nozzle 50a is arranged at such a height and at such a distance from bottom surface 3 that it is constantly below the level, prescribed by the process, of the material particles located and/or rotating in cutting compressor 1 and/or of the level of the mixing vortex formed during the movement and/or rotation of the material particles. Nozzle 50a is located in the region of the lower third of the total height of cutting compressor 1.

Nozzle 50a is arranged in side wall 2 in the region between upper mixing tools 21 and lower carrier disk 29 and thus empties into lower inner space part 10. In the case of more than two superposed carrier disks and/or mixing tools the gas supply means advantageously empty in the region between the uppermost and the lowest carrier disk or in the region between the uppermost and the lowest mixing tools. In this manner an advantageous flowthrough and thorough mixing and thus an advantageous workup of the material can be ensured.

Gas supply means 50, 50a, 50b advantageously do not empty in the region of the edges of the carrier disk or of the mixing tools but rather in particular in the region between each two carrier disks or mixing tools into receiving container 1 and/or are arranged there.

Nozzle 50a is designed as a singular opening in side wall 2 and has a diameter of approximately 70 mm. Additionally, even other such openings can be designed distributed uniformly over the circumference. Nozzle 50a is provided with a covering or shield 60 that prevents the rotating material from being able to be pressed into the inside of nozzle 50a. The covering is advantageously located in front of nozzle 50a upstream from the direction of rotation of the material. Nozzle 50a is arranged substantially on the side of receiving container 1 opposite discharge opening 15. A gas removal means 51 in the form of an active gas exhaust or a suction pump 53 is provided in the region above the material level. Alternatively, gas removal means 51 can also be designed as a passive gas removal means, which is the case in a simple embodiment, in particular in the case of a receiving container 1 open at the top.

Thus, dry, heated air is blown by nozzle 50a under pressure into the inside of container 1. This air is carried upward by the moved material by means of the forced flow being produced and receives the moisture present and entrains the problematic substances. The air enriched with problematic substances leaves receiving container 1 via exhaust 51a. A residual material almost free of problematic substances remains. In this manner the material can be freed almost completely of problematic substances by the advantageous synergistic cooperation of gas conduction 50, 51, of the two mixing tools 12, 21 and of the perforation 36.

Figure 4:
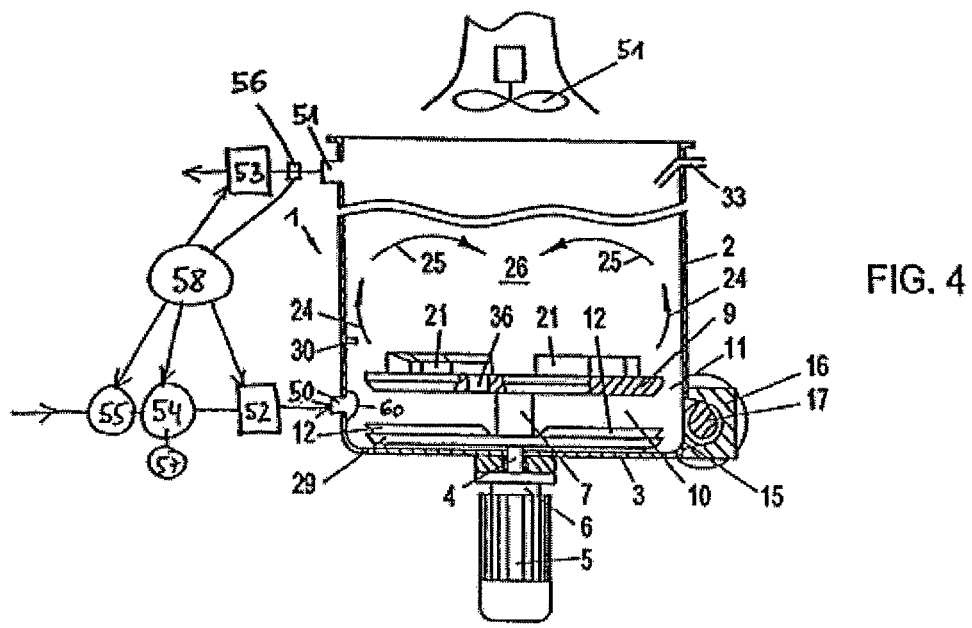
FIG. 4 shows another exemplary embodiment in vertical section.
Figure 5:
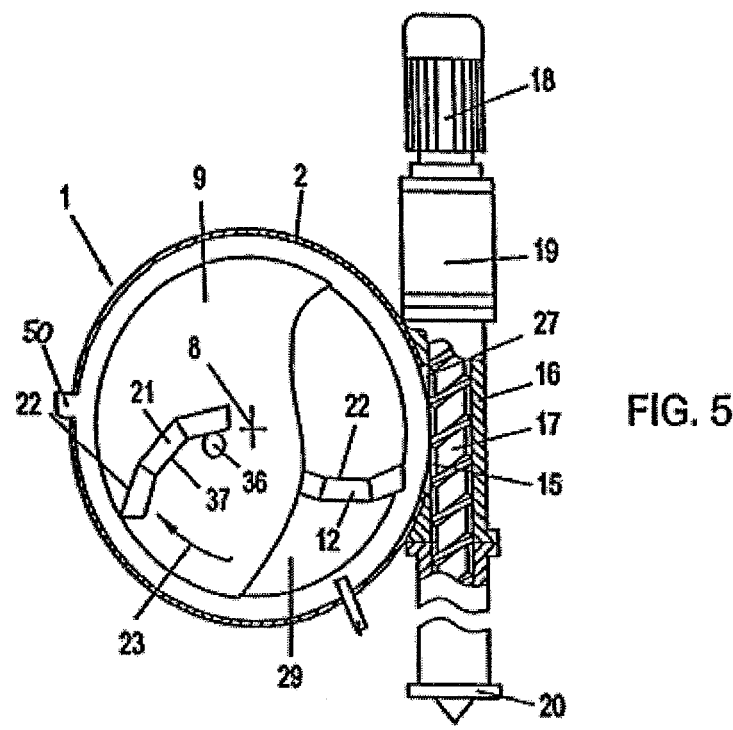
FIG. 5 is a top view of FIG. 4 in partial section.

The alternative embodiment according to FIG. 4, 5 differs from that according to FIG. 1, 2 in particular in that the lower mixing tools 12 are not suspended in an oscillating manner but rather are rigidly seated on another carrier disk 29 that is arranged coaxially to carrier disk 9 and can be driven in the rotational motion via the same shaft 4. As a result, rotor 7 can be constructed to be narrower or be entirely eliminated as an extension of shaft 4. As is the case in the embodiment according to FIGS. 1 and 2 the two lower mixing tools 12 are arranged at the level of discharge opening 15 of container 1 in order to be able to effectively convey the processed plastic material present in space 10 into draw-in opening 27 of worm housing 16.

The other lower mixing tools 12 present in space 10 under upper carrier disk 9 are rigidly arranged on a lower carrier disk 29 arranged under carrier disk 9 but can also be pivotably suspended on carrier disk 9 or on shaft 4.

As already presented in FIGS. 1 and 2 a gas supply means 50 is arranged in the region between carrier disks 9, 29 and/or between the upper and the lower mixing tools 21, 12 and empties into space 10.

It is purposeful to monitor the temperature of the material processed in container 1. To this end, as FIG. 4 shows, a temperature measuring unit 30 and a cooling apparatus 33 are provided in the upper cutting space 26 above carrier disk 9, which cooling apparatus can be constructed as a spray-in apparatus for cooling agent.

As already stated, the removal of the volatile problematic substances entering in upper cutting space 26 can be supported by an exhaust 51. To this end a suction removal apparatus 51 can be provided, as FIG. 4 shows, above the mixing vortex developing in this cutting space 26.

According to FIG. 4 a measuring apparatus 56 is arranged in the path of the gas exiting from receiving container 1 with which apparatus the temperature of the exiting gas and/or its moisture and/or the problematic substance content in this gas can be determined.

A control apparatus 58 is schematically shown with which the apparatus in accordance with the invention and its individual elements can be controlled and regulated. In the present case control apparatus 58 is shown connected to gas removal means 51 and gas supply means 50. A heating apparatus 54 as well as a gas drying apparatus 55 and a pump- or blower apparatus 52 are in the path of the supplied gas. The amount and/or the temperature and/or the pressure of the supplied gas can be regulated with these units under the effect of control apparatus 58. It is also possible to make use of the temperature and/or moisture of the exiting gas for regulating the temperature and/or amount and/or pressure of the supplied gas.

To the extent that receiving container 1 is constructed as a closed container the amount of the gas supplied through introduction opening 50 corresponds substantially to the amount of the gas exiting through the gas discharge 51. The exiting gas can have separation units for the entrained problematic substances, e.g., cyclones or gas separators and can be re-supplied to gas input opening 50 as purified gas, which is recycled in any case.

Figure 7:
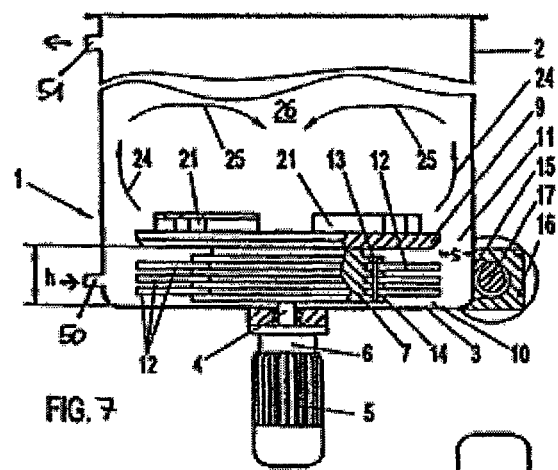
FIG. 7 shows a vertical section through another exemplary embodiment.
Figure 8:
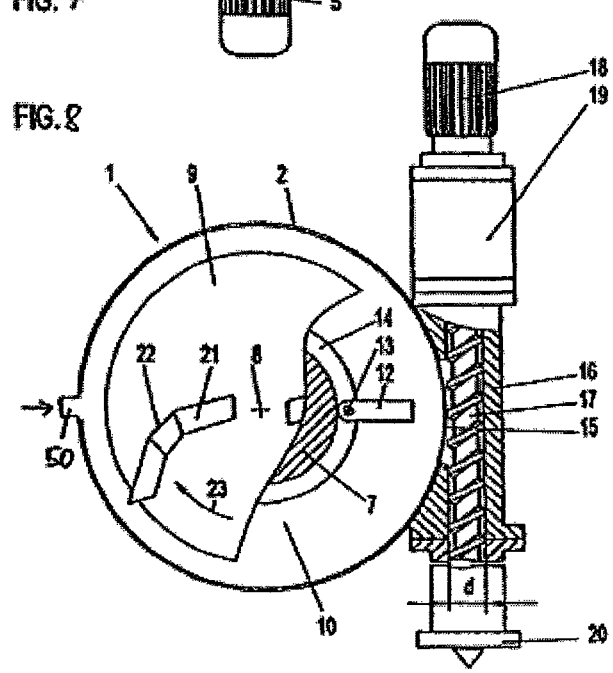
FIG. 8 shows a top view of it.

The apparatus according to FIGS. 7 and 8 is similar to the embodiment shown in FIGS. 1 and 2; however, no perforations 36 are formed in upper carrier disk 9. Refer to the above comments regarding the design.

Even in the present embodiment a free lower inner space part 10 is formed underneath upper carrier disk 9 which part has a free flow communication for the processed material with the upper inner space part 26 present above carrier disk 9 via the annular gap 11 present between the outside circumference of carrier disk 9 and side wall 2 of container 1. Thus, the processed plastic material can pas unhindered through this free annular gap 11 out of space 26 above carrier disk 9 into the annular inner space part 10 underneath it.

Lower mixing tools 12 are arranged in this annular space 10 that rotate about axis 8 in this annular space. The plastic material is pressed into a discharge opening 15 of container 1 by the centrifugal force exerted by these tools 12 on the plastic material, which opening 15 is at the level of tools 12 and connects lower inner space part 1 of container 1 to the inside of a cylindrical housing 16 in which a worm 17 is rotatably mounted.

Upper carrier disk 9 also carries upper mixing tools 21 that are, however, rigidly connected to carrier disk 9. These upper mixing tools 21 mix and/or comminute and/or heat the material located in upper inner space part 26 of container 1. It is purposeful for an effective comminution to design tools 21 with cutting edges 22.

During operation a rotation of the plastic mass introduced into container 1 takes place during the rotation of carrier disk 9 by the influence of tools 21, during which the plastic material rises up (arrow 24) along side wall 2 of container 1 in the upper inner space part 26 and falls back down again in the region of the axis of container 1 (arrow 25). The mixing vortex being produced in this manner thoroughly swirls the introduced material so that a good mixing effect is achieved. However, a small amount of the already comminuted material introduced into container 1 passes through annular gap 11 into the lower inner space part 10 under upper carrier disk 9 and is processed there by lower mixing tools 12. After a short running-in time a state of equilibrium is adjusted between the material removed by worm 17 out of discharge opening 15 and therefore out of annular space 10 and between the material supplied through annular gap 11 from above into annular space 10. This has the result that it is very improbable or even impossible that a plastic particle, once it has been introduced into container 1, passes into worm housing 16 without having previously spent a sufficient dwell time in container 1 and/or without having been sufficiently processed by tools 11, 21. The amount of plastic passing through discharge opening 15 that is removed by worm 17 therefore has an approximately uniform quality, especially as concerns the temperature and the size of the plastic particles. Worm 17 therefore has to do less work with the plastic mass in order to bring the plastic mass to the desired degree of plasticization, which has the result that high thermal peak loads do not occur on the plastic material in worm housing 16. This protects the plastic material and significantly saves energy for the drive of worm 17.

The form and size of annular space 10 are a function of the intended area of application. The distance h at which the bottom of carrier disk 9 is from bottom 3 of container 1 is a function of the height of rotor 7 and also of the size and position of discharge opening 15. Favorable conditions result if height h of annular space 10 is at least equal to and preferably significantly greater than the diameter d of worm 17 and/or to the inside diameter of worm housing 16. In the exemplary embodiment shown in FIG. 7 h:d=1.56 and the arrangement is advantageously such that the part of annular space 10 covered by carrier disk 9 and located outside of rotor 7 has an approximately quadratic cross section. Other cross-sectional forms of this annular space are possible, in particular if other tools are rotating in this annular space 10, e.g., a rotor 7 constructed as a bucket wheel.

As is apparent, the size of annular gap has an influence on the described method of operation. This annular gap should not be too large in order to prevent rather large particles of material from being able to pass through this annular gap 11. On the other hand, this gap should also not be too small as otherwise too little material passes under carrier disk 9 into lower inner space part 10 and there is thus the danger that worm 17 is insufficiently filled.

In order to be able to adapt to different materials to be processed the size of annular gap 11 can be designed to be variable, e.g., by structural components carried by carrier disk 9 and adjustable relative to it by means of which components gap 11 can be partially covered or made free with an enlarged width. Such structural components can also be provided if necessary on wall 2 of container 1. Tests have shown that advantageous values for the width s (FIG. 7), measured in radial direction, of annular gap 11 in the range of 20 to 150 mm, preferably 20 to 100 mm result independently of the diameter of receiving container 1 but dependent on the type of material to be processed.

It is purposeful to design tools 12 present in lower inner space part 10 of receiving container 1 in such a manner that they process the plastic material present in this inner space part 10 less intensively than the tools 21 carried by carrier disk 9 and rotating in the upper inner space part 26 of container 1.

Even in this embodiment a gas supply means 50 is arranged in the region between carrier disks 9, 29 and between the upper and the lower mixing tools 21, 12 and empties into space 10.

Figure 9:
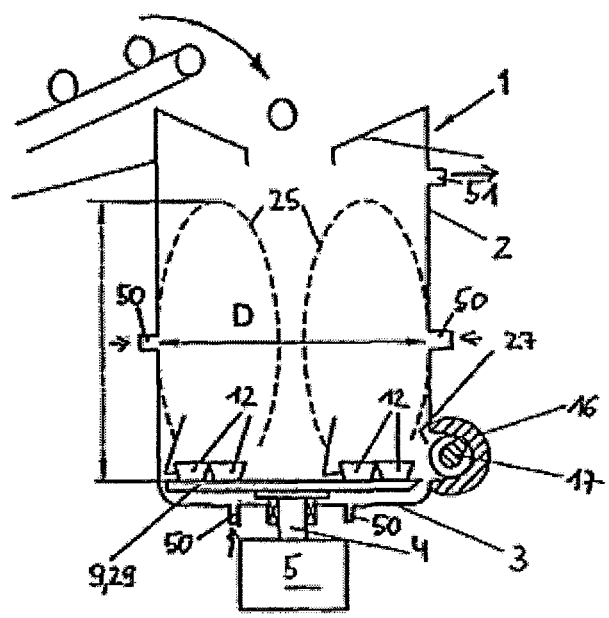
FIG. 9 shows another exemplary embodiment in vertical section.

FIG. 9 shows another exemplary embodiment in vertical section.

This apparatus comprises a receiving container 1 in which only a single carrier disk 9, 29 with mixing tools 12, 21 is provided in the lower region just above bottom 3 at the level of discharge opening 15. These mixing tools 12, 21 produce a movement of the material particles and a mixing vortex 25.

An active gas supply means 50a in the form of an annular gap rotating in particular almost continuously around shaft 4 is provided in bottom 3, namely, in the innermost third region of bottom surface 3 via which gas is blown in with a blower 52. In addition, another active gas supply means 50a is formed in side wall 2 of container 1 at the level at which the greatest pressure is exerted on side wall 2 by the moved material particles, which other gas supply means is also constructed as a rotating annular gap also extending over almost the entire circumference. Gas is blown into the interior of container 1 by both gas supply means 50a, passes through the material and is removed again via gas removal means 51 enriched with problematic substances FIGS. 10 and 11 show another exemplary embodiment in vertical section as well as in a top view. The apparatus only partially shown in FIGS. 10 and 11—only the lowest carrier disk 29 and the lowest mixing tools are shown—corresponds in the features which are not shown to the apparatuses shown in FIGS. 1 to 9. Therefore, refer to these FIGS. 1 to 9 regarding the features which are not shown.

Several transport wings 65 are arranged on the bottom of the lowest carrier disk 29. These transport wings 65 start radially from the region of the center of carrier disk 29, are curved counter to the direction of rotation and extend over almost the entire radius of carrier disk 29. Transport wings 65 are constructed as beam-shaped cross-pieces and extend into the region between carrier disk 29 and bottom surface 3.

Transport wings 65 generate a flow during operation and bring about a flow of material that bring it about that no material to be processed remains in this region under carrier disk 29. The material to be processed is transported up again through annular gap 11 into the region above carrier disk 29 by transport wings 65. If perforations 36 are formed in carrier disk 29, the material can also pass through these perforations 36.

Gas supply means 50 are formed in bottom surface 3 of receiving container 1 in the vicinity of central axis 8 and empty into the region below carrier disk 29. Gas supply means 50 can be constructed as active or as passive gas supply means 50a, 50b. In this manner gas or air can be actively introduced into the region below carrier disk 29 or is drawn in by transport wings 65. The gas then flows, as shown in FIG. 10 by the arrows 68, up through annular gap 11 during which it supports the bringing out of the material to be processed from the region below carrier disk 29. Also, the gas flows through any perforations 36 formed, as shown in FIG. 10 by arrows 69, and also transports material upward in this manner.

In this embodiment thus transport wings 65 thus advantageously cooperate with gas supply means 50 and optionally with the perforations and ensure in this manner an effective discharge of material from the region below carrier disk 29.

Such transport wings 65 or such a combination arrangement of transport wings 65, perforations 36 and/or gas supply means 50 can be constructed in all apparatuses shown in FIGS. 1 to 9.

Figure 12:
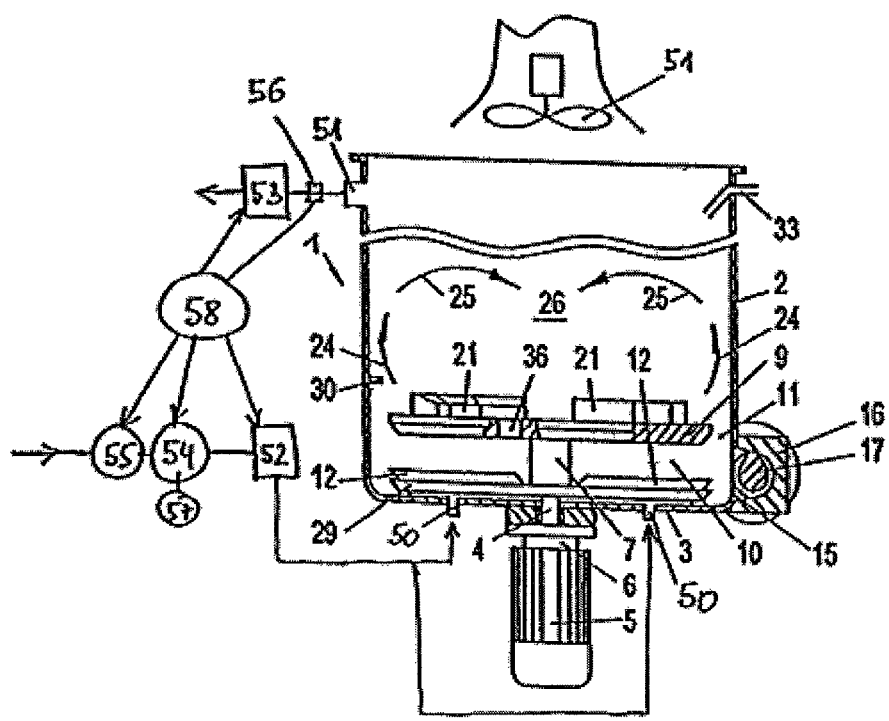
FIG. 12 shows another exemplary embodiment in vertical section.

FIG. 12 shows another advantageous embodiment. It is constructed in analogy with the embodiment according to FIGS. 4 and 5. Refer in this regard to the comments for FIGS. 4 and 5. In distinction to FIGS. 4 and 5, gas supply means 50, 50a, 50b are constructed in bottom surface 3 as is also the case in the embodiments of FIGS. 9, 10 and 11.

The invention claimed is:

1. An apparatus for the treatment of material, the material comprising thermoplastic polymer particles or polymer flakes, the apparatus comprising:
   at least one receiving container or cutting compressor which is cylindrical and comprises a horizontal bottom surface and a vertical side wall;
   at least one mixing tool disposed in the receiving container or cutting compressor, wherein the tool is rotatable about a vertical axis, wherein the tool causes the material to rotate;
   at least one gas supply means for the entrance of a gas into an interior of the receiving container or cutting compressor disposed at the receiving container or cutting compressor below a level of the material during operation; and
   at least one gas removal means for the discharge of the gas from the receiving container or cutting compressor, disposed at the receiving container or cutting compressor above the level of the material during operation;
   wherein the gas supply means is disposed in the side wall of the receiving container or cutting compressor and supplies the gas through the side wall of the receiving container or cutting compressor into the receiving container or cutting compressor such that the gas directly contacts the material adjacent the side wall immediately upon the entrance of the gas through the side wall into the interior of the receiving container or cutting compressor.

2. The apparatus according to claim 1, further comprising at least one worm for removing the material from the receiving container or cutting compressor, the worm comprising a housing with a draw-in opening connected to a discharge opening of the receiving container or cutting compressor, wherein the discharge opening is disposed in the side wall of the receiving container or cutting compressor.

3. The apparatus according to claim 1, wherein the mixing tool is disposed on a carrier disk configured to rotate about the axis by a shaft in the inner space of the receiving container or cutting compressor.

4. The apparatus according to claim 1, wherein the at least one mixing tool is at least two-mixing tools comprising an upper mixing tool disposed on an upper carrier disk and a lower mixing tool disposed on a lower carrier disk;
  wherein the receiving container or cutting compressor defines an upper inner space part above the upper mixing tool and a lower inner space part underneath the upper mixing tool;
  wherein the upper inner space part communicates with the lower inner space part via a free annular gap defined between an outside circumference of the upper carrier disk and the side wall of the receiving container or cutting compressor;
  wherein during rotation of the upper mixing tool, a portion of the material present in the upper inner space part passes through the annular gap into the lower inner space part and is transported from the lower inner space part by the lower mixing tool.

5. The apparatus according to claim 4, wherein the upper carrier disk comprises at least one perforation which extends through the carrier disk and connects the upper inner space part to the lower inner space part.

6. The apparatus according to claim 3, wherein the gas supply means is a passive gas supply means or an active gas supply means.

7. The apparatus according to claim 1, wherein the gas removal means is a passive gas removal means or an active gas removal means.

8. The apparatus according to claim 1, further comprising at least one member of the group consisting of:
  a heating apparatus connected in front of the gas supply means, wherein the gas to be introduced into the interior of the receiving container or cutting compressor can be heated via the heating apparatus; and
  a gas drying apparatus connected in front of the gas supply means, wherein the gas to be introduced into the interior of the receiving container or cutting compressor is dried via the gas drying apparatus.

9. The apparatus according to claim 1, wherein at least one of the gas supply means and the gas removal means can be closed or controlled at least partially.

10. The apparatus according to claim 1, wherein the gas supply means is an individual singular opening, with a diameter between 10 and 300 mm.

11. The apparatus according to claim 1, wherein the gas supply means has a covering or shield on a side of the gas supply means facing the interior of the receiving container or cutting compressor for protection against the material present in the receiving container or cutting compressor.

12. The apparatus according to claim 1, wherein the gas supply means seals flush with an inner wall of the container or of the mixing tool.

13. The apparatus according to claim 1, wherein the gas supply means is disposed in a lower third of the receiving container or cutting compressor.

14. The apparatus according to claim 4, wherein the gas supply means is disposed in the side wall between the upper carrier disk and the lower carrier disk, and empties into the lower inner space part, wherein the gas supply means empties between the upper carrier disk and the lower carrier disk.

15. The apparatus according to claim 1, wherein the gas supply means is disposed in a region of the side wall in which the material particles exert greatest pressure on the side wall.

16. The apparatus according to claim 1, wherein the gas supply means comprises a plurality of gas supply means disposed in the side wall uniformly distributed at a same level over a circumference of an inside wall of the receiving container or cutting compressor.

17. The apparatus according to claim 1, wherein the gas supply means comprises a circumferential gap in the side wall.

18. The apparatus according to claim 1, wherein the gas supply means is disposed on a lowest one of the at least one mixing tool.

19. The apparatus according to claim 1, wherein the gas supply means is disposed in the vicinity of the axis.

20. The apparatus according to claim 3, further comprising one or more transport wings that project radially from a bottom of the carrier disk, wherein the transport wings bring about a flow of material and gas upward from below the carrier disk to above the carrier disk.

21. The apparatus according to claim 1, wherein the gas removal means is disposed remote from the bottom surface of the receiving container or cutting compressor and from the material.

22. The apparatus according to claim 1, further comprising at least one measuring apparatus, wherein the measuring apparatus is loaded by gas that has been removed by the gas removal means, wherein the measuring apparatus is configured to measure at least one member of the group consisting of: temperature, moisture, and content of problematic substances in the gas that has been removed.

23. The apparatus according to claim 8, further comprising a control apparatus that is connected to at least one member of the additional group consisting of the heating apparatus, the gas drying apparatus, the gas supply means, and the gas removal means, wherein the control apparatus controls the member of the additional group as a function of at least one of given material parameters, a temperature of gas that has been removed by the gas removal means, and a type of problematic substances in the gas that has been removed by the gas removal means.

24. An apparatus for treatment of thermoplastic polymer particles or polymer flakes, comprising:
  at least one receiving container or cutting compressor;
  one or more mixing tools disposed in the receiving container or cutting compressor, wherein the tools are rotatable about a vertical axis wherein the tools cause the material to rotate,
  at least one gas supply means for the entrance of a gas into an interior of the receiving container or cutting compressor disposed at the receiving container or cutting compressor below a level of the material during operation; and
  at least one gas removal means for the discharge of the gas from the receiving container or cutting compressor, disposed at the receiving container or cutting compressor above the level of the material during operation;
  wherein the gas supply means is disposed in a side wall of the receiving container or cutting compressor and supplies the gas through the side wall of the receiving container or cutting compressor into the receiving container or cutting compressor above a lowest one of the mixing tools.

* * * * *